US012011698B2

(12) United States Patent
Fleck

(10) Patent No.: US 12,011,698 B2
(45) Date of Patent: Jun. 18, 2024

(54) INTERMIXING DEVICE HAVING CONE SHAPED EXTENSIONS AND METHOD FOR INTERMIXING A COMPOUND

(71) Applicant: Vinzenz Fleck, Frohnleiten (AT)

(72) Inventor: Vinzenz Fleck, Frohnleiten (AT)

( * ) Notice: Subject to any disclaimer, the term of this patent is extended or adjusted under 35 U.S.C. 154(b) by 1050 days.

(21) Appl. No.: 15/101,205

(22) PCT Filed: Dec. 2, 2014

(86) PCT No.: PCT/AT2014/050290
§ 371 (c)(1),
(2) Date: Jun. 2, 2016

(87) PCT Pub. No.: WO2015/109347
PCT Pub. Date: Jul. 30, 2015

(65) Prior Publication Data

US 2016/0303529 A1 Oct. 20, 2016

(30) Foreign Application Priority Data

Jan. 27, 2014 (AT) .................................. 50048/2014

(51) Int. Cl.
*B01F 31/441* (2022.01)
*B01F 31/40* (2022.01)
*B01F 31/44* (2022.01)

(52) U.S. Cl.
CPC ............ *B01F 31/441* (2022.01); *B01F 31/40* (2022.01); *B01F 31/449* (2022.01)

(58) Field of Classification Search
CPC .............. B01F 11/0054; B01F 11/0082; B01F 11/0085; B01F 11/0091; B01F 31/441;
(Continued)

(56) References Cited

U.S. PATENT DOCUMENTS 852,720 A * 5/1907 Hiss ........................ D06F 15/00 366/289
964,291 A * 7/1910 Mattern .............. B01F 11/0082 366/256

(Continued)

FOREIGN PATENT DOCUMENTS

CH 560066 A5 * 3/1975 .......... B01F 11/0091
CN 101543741 9/2009

(Continued)

OTHER PUBLICATIONS

Machine translation from STIC of SU 1592026 A1 Sep. 1990.*

(Continued)

*Primary Examiner* — Charles Cooley
(74) *Attorney, Agent, or Firm* — GREENBLUM & BERNSTEIN, P.L.C.

(57) ABSTRACT

Device and method for intermixing a mass. The device includes a container and a mixing unit arranged on the container. The mixing unit includes at least one piston that is positioned in the container, and is movable in a linear direction and has at least one mixing element. The mixing element extends around the piston and includes an upper planar surface and an opposed lower planar surface. The mixing element further includes cone-shaped extensions extending from the lower planar surface and conically tapering in the linear direction away from the lower planar surface to an opening at an end of the cone-shaped extensions facing a bottom of the container to facilitate movement of the piston in the linear direction for intermixing the mass.

29 Claims, 2 Drawing Sheets

(58) Field of Classification Search
CPC ........ B01F 31/40; B01F 31/449; B01F 23/47; B01F 23/57; B01F 27/93; B01F 31/00; B01F 31/401; A61K 8/04; B29B 7/08; B29B 7/36
USPC ................... 366/78, 289, 256–260, 332–335
See application file for complete search history.

(56) References Cited

U.S. PATENT DOCUMENTS

| | | | | | |
|---|---|---|---|---|---|
| 980,824 | A * | 1/1911 | Noakes | B01F 11/0082 | 366/256 |
| 1,251,878 | A * | 1/1918 | Fay | B01F 11/0082 | 241/168 |
| 2,013,444 | A * | 9/1935 | Kenney | C12C 7/065 | 366/295 |
| 2,615,692 | A * | 10/1952 | Muller | B01F 11/0082 | 366/273 |
| 2,681,798 | A * | 6/1954 | Muller | B01F 11/0091 | 366/118 |
| 2,825,134 | A * | 3/1958 | Hicks | A61C 9/0026 | 433/90 |
| 3,140,078 | A * | 7/1964 | Grubb | B01F 11/0082 | 222/136 |
| 3,164,303 | A | 1/1965 | Trautmann | | |
| 3,541,004 | A * | 11/1970 | Cooper | B01D 65/02 | 210/636 |
| 4,511,254 | A | 4/1985 | North et al. | | |
| 4,685,811 | A * | 8/1987 | Pollard | B01F 11/0045 | 366/275 |
| 4,923,817 | A * | 5/1990 | Mundt | B01F 3/04531 | 435/286.6 |
| 4,946,286 | A | 8/1990 | Purkapile | | |
| 4,952,065 | A | 8/1990 | Kreuziger | | |
| 5,813,760 | A * | 9/1998 | Strong | B01F 11/0082 | 366/258 |
| 6,454,455 | B1 * | 9/2002 | Jungvig | A47J 43/27 | 366/129 |
| 7,216,761 | B2 * | 5/2007 | de Vries | A61B 17/8825 | 206/222 |
| 7,278,781 | B2 * | 10/2007 | Haughton | B01F 11/0082 | 366/316 |
| 7,905,654 | B1 | 3/2011 | Cordero | | |
| 7,959,346 | B2 * | 6/2011 | Loden | A47J 43/27 | 220/568 |
| 8,342,737 | B2 * | 1/2013 | Greller | B01F 3/04262 | 366/102 |
| 9,145,538 | B2 * | 9/2015 | Loos | B01F 11/0082 | |
| 2005/0127215 | A1 | 6/2005 | Leinhart et al. | | |
| 2005/0128868 | A1 * | 6/2005 | Vries | A61B 17/8825 | 366/139 |
| 2006/0221766 | A1 | 10/2006 | Haughton | | |
| 2007/0171767 | A1 * | 7/2007 | Huang | A23G 9/045 | 366/289 |
| 2007/0211563 | A1 * | 9/2007 | De Vries | A61B 17/8825 | 366/139 |
| 2008/0177273 | A1 * | 7/2008 | deVries | B01F 13/002 | 606/94 |
| 2009/0027997 | A1 * | 1/2009 | Meier | B01F 3/04539 | 366/281 |
| 2014/0238941 | A1 * | 8/2014 | Haydock | B01F 7/00916 | 210/721 |
| 2016/0303529 | A1 * | 10/2016 | Fleck | B01F 11/0054 | |
| 2017/0333857 | A1 * | 11/2017 | Barksdale | B01F 11/0082 | |

FOREIGN PATENT DOCUMENTS

| | | | | |
|---|---|---|---|---|
| CN | 102057748 | | 5/2011 | |
| DE | 35 12 548 | | 10/1986 | |
| DE | 102006020461 | B3 * | 10/2007 | B01F 11/0082 |
| DE | 60 2004 004 649 | | 11/2007 | |
| EP | 0 196 291 | | 10/1986 | |
| EP | 1 533 024 | | 5/2005 | |
| GB | 237 660 | | 8/1925 | |
| GB | 510 498 | | 8/1939 | |
| GB | 2 145 634 | | 4/1985 | |
| SU | 877 833 | | 4/1982 | |
| SU | 1 134 227 | | 1/1985 | |
| SU | 1 592 026 | | 9/1990 | |

OTHER PUBLICATIONS

Europe Office Action/Search Report conducted in counterpart Europe Appln. No. 14 825 087.1 (Jan. 14, 2020) (w/ partial machine translation).

China Search Report/Office Action conducted in counterpart China Appln. No. 202210157695.9 (Sep. 27, 2023).

* cited by examiner

INTERMIXING DEVICE HAVING CONE SHAPED EXTENSIONS AND METHOD FOR INTERMIXING A COMPOUND

BACKGROUND

1. Field of the Invention

The invention relates to a device for intermixing a mass such as a dispersion, comprising a container, particularly a large-volume container, and a mixing unit arranged on the container.

Furthermore, the invention relates to a use of a device of the type named above.

2. Discussion of Background Information

Additionally, the device relates to a method for intermixing a mass such as dispersion in a container, particularly a large-volume container, with a mixing unit arranged on the container by means of a movement of the mixing unit.

An intermixing of a mass can involve both a homogenization or a circulation of a heterogeneous mass and also, for example, a stirring of an already homogeneous mass. Typical intermixing processes are used, among other things, in a production of articles of daily use. For example, blending or intermixing processes are necessary in a production of diverse cosmetics or in food production, for example in the treatment of mashes.

Various devices and methods for intermixing a mass are known from the prior art. In common devices, one or more propellers are arranged in a container, wherein the mass which is to be intermixed is also located in the container. By means of a high rotational speed of the propeller, an intermixing of the mass is attempted. In large-volume containers with correspondingly large masses, a propeller is not sufficient; an array of multiple propellers is necessary in order to guarantee a complete intermixing. In order to allow the propellers to be operated at a sufficiently high rotational speed, a correspondingly large energy expenditure is required. Furthermore a time expenditure until a mass is completely intermixed should not be underestimated. In the case of heterogeneous masses, in which a solid phase predominates or which are very viscous, an intermixing using propellers is sometimes not possible. In a mass or in highly viscous media of this type, the propellers sooner or later come to a standstill, or they become damaged and can no longer be used. Even for masses in a large-volume container with a correspondingly large volume, a complete intermixing is not possible. The mass is thereby intermixed only locally, or it is only moved by the propeller without an intermixing occurring.

Furthermore, from the prior art, devices for equalizing the temperature of a mass in a usually large-volume container are known. The mass or parts thereof are thereby circulated on a recurring or continuous basis. This process is technically complicated and cost-intensive.

Another device known from the prior art for intermixing masses comprises a grid that can be inserted into a container and is arranged vertically relative to container walls. A grid of this type is primarily used in the production of red wine. The distances between the individual grid bars are thereby relatively large, so that large-area holes are created. With a device of this type, an intermixing of heterogeneous masses or a circulation of a large mass is not possible to a satisfactory extent. This type of device thus can only be used for red wine production, but cannot be used universally.

Other different mixing devices with a piston-cylinder unit are known from the prior art, which devices dip various types of immersion systems into a container with a mass that is to be intermixed. The immersion elements used thereby can have a wide variety of different forms. One type of these immersion elements is designed similarly to a propeller and thus has the disadvantages discussed above. Other immersion elements have a relatively small design and are arranged close to the piston. These immersion elements have the disadvantage that it is thus difficult to completely intermix a mass in the container.

Multiple types of devices for intermixing a mass each fulfill their purpose for a specific type of mass. However, from the prior art, no device is known which can intermix or bring to a specific temperature the largest possible number of heterogeneous and also homogeneous masses, the latter in relation to a temperature equalization within the mass, with a result that is roughly equally satisfactory.

SUMMARY

Accordingly, the invention is directed to a device of the type named at the outset with which a simple and efficient intermixing of a mass is possible and which can be used as universally as possible.

Further, the invention is directed to a use of a device of this type.

Furthermore, the invention is directed to a method of the type named at the outset with which a mass is easily and efficiently intermixed and which can be used for intermixing different types of masses.

According to the invention, for a device of the type named at the outset, the mixing unit comprises at least one piston that is positioned in the container and can be moved linearly and has at least one mixing element, wherein the mixing element extends in a planar manner around the piston for the purpose of intermixing the mass.

One advantage attained by the invention can in particular be seen in that, with the linear movement of the piston, a power or energy consumption is less than for a rotating movement of a propeller or the like. As a result of the linear movement of the piston with the mixing element, the mass that is to be intermixed is moved with locally varying flow rates. The suction effect consequently restores an equilibrium of forces, and the mass is thus intermixed. The planar mixing element thus achieves both a complete and also a rapid intermixing of the mass. A speed of the linear movement can thereby be set as needed, depending on which type of mass is to be intermixed. By means of the planar extension of the mixing element around the piston, a large circulation and thus a quick intermixing is ensured. Even in the case of, for example, viscous masses, there is no problem of a rapid deterioration of the mixing element, since there is no risk of the planar mixing element remaining stuck in the mass. Furthermore, the device according to the invention allows an intermixing of masses with different viscosities, since the suction effect is present for all viscosities of masses. In addition, the device allows a specific temperature to be set for a homogeneous mass. The different local flow rates result not only in pressure differences, but also in temperature differences, which also compensates the force of the suction effect. An equalization of temperature differences also counteracts a demixing of a mass, which frequently occurs particularly in large-volume containers. The device according to the invention is particularly suitable for intermixing a free-flowing mass.

A device according to the invention can be used in all areas in which a mass is to be homogenized with respect to individual components and/or an equalized temperature in a container with a larger volume, particularly of more than five liters. A device according to the invention has proven particularly effective primarily for the circulation of mashes in beer production, especially strong beers, which require an extremely thick or viscous mash as a basis. Furthermore, a device according to the invention has proven suitable for the purpose of homogenizing masses with different pH values, e.g. for acidification.

It is preferably provided that the mixing element is positioned at a first end of the piston. In this manner it is achieved that the mixing element can be moved from one end to an opposite end of the container. The first end of the piston is thereby located in the container, whereas a second end of the piston normally remains outside of the container over the entire stroke and is connected to a drive. It is further advantageous if the mixing element constantly remains below a fill level during the intermixing process in order to keep an introduction of air as low as possible.

It is advantageous if the piston is positioned such that it can be rotated around a longitudinal axis, in order to ensure an even quicker or more effective intermixing of a mass. Furthermore, this second possibility of a movement of the piston with the mixing element creates an even wider scope of application. In particular, this enables an extremely individual adaptation to different types of masses and/or the same device can be used for different types of masses, wherein mixing processes can be optimized by activating a simultaneous rotational movement during a stroke. Additionally, as a result of the rotational movement, a stability of the piston with the mixing element is increased during a linear movement.

It is advantageous if, roughly in a geometric center of the mixing element, the piston is connected to said element, wherein the mixing element extends roughly on a plane around the piston. The central arrangement of the mixing element provides a complete and even intermixing of the mass.

Expediently, it is provided that the mixing element comprises recesses. In combination with a linear movement of the piston and of the mixing element, the recesses achieve an even more efficient and quicker intermixing of a mass. A suction effect can thereby occur in both directions during the linear movement of the piston. However, a dominant effect in the intermixing process occurs when the piston with the mixing element is pulled out. As a result of the recesses in the mixing element, more numerous and more finely separated local flow rates occur during the movement. In this manner it is thus ensured that the entire mass is completely intermixed or brought to the same temperature following an intermixing process. A geometry of the recesses and the number thereof can be freely selected thereby, but are dependent on a thickness or height of the mixing element. The thinner or flatter the design of a mixing element, the fewer or smaller the recesses that can be provided. Furthermore, the dimensions of the mixing element depend on a mass that is to be mixed or on a viscosity and a temperature of the mass, and on a speed of the linear movement of the piston. In addition, a movement or an intermixing of the mass takes place as a function of the different parameters, which also interact with one another.

It can also be provided that the mixing element comprises on a planar side cone-shaped and/or cylindrical extensions. The cone-shaped extensions facilitate an intermixing during a linear movement of the piston. The cylindrical extensions, which extend starting from the mixing element against a rotation direction of the piston, produce a slight rotation of the piston in order to better handle turbulences in the container. It can be provided that the extensions are arranged on a mixing element with recesses. The cone-shaped extensions can thereby be embodied in a flexible or bendable manner, so that they can change their position depending on the direction of movement of the piston.

It can also be preferably provided that the mixing element is embodied in a curved manner. The curvature of the mixing element can thereby be embodied in the two different linear movement directions of the piston, depending on a type of intermixing process. Depending on which type of mass is to be intermixed, the mixing element is embodied in either a flat or curved manner. It is also possible that the mixing element is embodied in a flexible manner and is thus, depending on the movement direction of the piston, curved in one direction for one movement direction and in an opposite direction for an opposite movement direction.

The piston can be positioned in any desired locations on the container. It is possible that the piston can be moved or displaced horizontally. Typically, however, the piston is positioned in a vertically moveable manner in a container. In this case, the mass that is to be intermixed does not come into contact with the bearing of the piston, as a result of which there is no need to provide special measures for sealing the container.

Furthermore, for the same reasons, it is advantageous if the mixing unit is fixed to an upper end of the container. In this arrangement, the container need not necessarily be completely sealed against the mixing unit. However, it can also be provided that the container can be or is closed in a pressure-tight manner.

It is expedient if a ratio of a diameter of the container to the mixing element is at least 1.2:1. Preferably, it is provided that the mixing element is arranged at a distance from a container wall. The diameter of the mixing element is preferably between 10% and 90%, in particular between 20% and 70%, and ideally between 25% and 40% of the diameter of the base of the container. It is thus ensured that the force to be applied for the intermixing is as small as possible, but the success of the intermixing is as great as possible. It is presumed that, during a movement of the mixing element upwards, mass flows through the recesses in the mixing element in the direction of the base. The resulting pressure difference can be equalized in that mass flows upwards between the mixing element and walls of the container and the mass is thus intermixed. According to the invention, it can be provided that, in a top view, a geometry of the mixing element corresponds to a cross section of the container transverse to the axis of movement of the piston. For example, in the case of a container with a round cross section, a mixing element that is round in a top view is advantageously provided. Exact flow directions and turbulences of the mass in the container during a movement of the mixing element are, in turn, dependent on different parameters, such as on the thickness and diameter of the mixing element, the size and arrangement of the recesses in the mixing element, the viscosity and temperature of the mass, and the speed and type of movement of the mixing element.

It can be provided that at least one additional agitator distanced from the piston is provided. Such an agitator can, for example, be a propeller known from the prior art. This propeller assists the mixing element with masses that are costly to intermix. The propeller, which is typically arranged on the base of the container, thereby lifts the mass off of the base and the mixing element performs the remaining intermixing.

For particularly large-volume containers, it can be provided that at least one additional mixing element is arranged, wherein the additional mixing element is fixed at a distance from the first mixing element. By means of the additional mixing element, a path of the vertical movement of the piston is reduced and, as a result, a duration and an energy expenditure of an intermixing process for a mass are lowered, which ultimately also results in a cost reduction.

A use of a device according to the invention is, as illustrated, particularly suitable for producing mash.

For a method of the type named at the outset, the mixing unit comprises at least one piston and at least one mixing element, wherein the mixing element is positioned in a planar manner around the piston and the piston is moved linearly for the purpose of intermixing the mass.

An advantage of the method according to the invention can in particular be seen in that, by means of the planar mixing element and the linear movement, a very large amount of mass can be intermixed at one time and, as a result, a mixing time and an amount of energy that is to be expended are consequently reduced. Through the linear movement of the piston with the mixing element, varying local flow rates and therefore different pressures and temperatures can be set in the mass. This disequilibrium of forces is compensated by a suction effect, and the mass is intermixed or brought to an equal temperature for the entire mass. Furthermore, as a result of the linear movement, shearing forces that can damage the mass are kept to minimum. In contrast to the intermixing by means of one or more propellers, a mass can be intermixed using a lower number of movement steps. Preferably, it can be provided that the mixing unit is connected to a boundary surface of the container and that the mixing element is permanently movably positioned in the container. Through this measure, the entire device is closed off to the outside, and the method can be performed without a loss of mass, for example, due to sloshing. As a result of the permanent positioning of the mixing element in the container, the mixing element hardly comes into contact with the surrounding air and is thus protected against corrosion or the like. Particularly preferably, it is provided that the mixing element is permanently covered by the mass that is to be intermixed, in order to keep an introduction of air to a minimum.

It is advantageous for an effective circulation if the mixing unit comprises recesses and the mass is circulated while flowing through the recesses. Particularly for mashes in alcohol production, where solids are deposited on a container base, this has proven to be an advantageous variant. Through a lifting of the piston with a vertical positioning of the same, the solids are also lifted off of the base and must then escape downwards through the recesses, which produces a turbulence and thus promotes the desired intermixing.

It can be provided that the piston with the mixing element is rotated around a longitudinal axis of the piston and the linear movement of the piston is thus facilitated. An intermixing time is thus subsequently reduced, or the effectiveness of an intermixing process is further increased. A stability of the piston and of the mixing element is thus also achieved.

BRIEF DESCRIPTION OF THE DRAWINGS

Additional features, advantages and effects of the invention follow from the exemplary embodiments described below. The drawings which are thereby referenced show.

DETAILED DESCRIPTION

Figure 1:
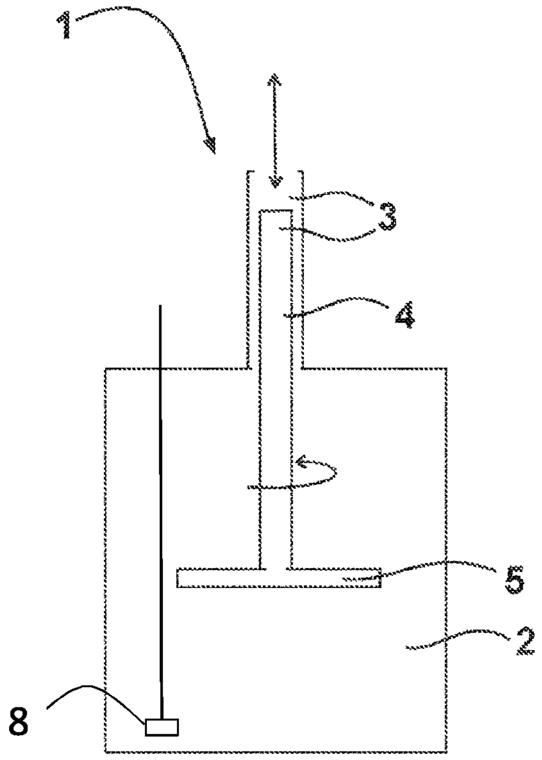
FIG. 1 illustrates a device according to the invention.

FIG. 1 shows a device 1 according to the invention for intermixing a mass. The device 1 comprises a container 2 and a mixing unit 3. The mixing unit 3 is thereby arranged on the container 2 and comprises at least one piston 4 having a mixing element 5. Preferably, the mixing unit 3 is, as in FIG. 1, arranged on an upper side of the container 2; however, it can also be provided according to the invention that the mixing unit is arranged on a side wall or the base of the container 2. Furthermore, it is provided that the piston 4 with the mixing element 5 is positioned in the container 2. The container 2 with the mixing unit 3 can be embodied such that it is closed or can be closed by a lid or another cap, in order to prevent an escape of the mass. It can also be provided that the container 2 can be closed in a pressure-tight manner. Furthermore, it is provided that the piston 4 can be moved linearly in two opposing directions. As a result, the mixing element 5 arranged on the piston 4 can also be moved linearly. The linear movement can thereby be driven in any desired manner. For example a mechanical, hydraulic, electrical or manual drive by cable operation is conceivable. A spring can constitute another possibility for driving the linear movement. If the piston 4 with the mixing element 5 is arranged on an upper side of the container 2, it can be provided that the piston is arranged on a spring that is tensioned downwards in a movement of the piston 4 and released in an upward movement of the same. A speed of the movement can be adapted to the mass that is to be intermixed and typically ranges between 0.01 m/s and 10 m/s.

The mixing element 5 extends in a planar manner around the piston 4 and can be arranged at any desired location of the piston 4. However, it is preferably provided that the mixing element 5 is positioned at an end of the piston 4 and that the piston 4 is fixed roughly centrally on the mixing element 5 for the purpose of optimizing a stability. The mixing element 5 can thus be moved linearly from a first end of the container 2 to a second end of the container 2 in order to completely intermix the mass. It can be provided that the mixing element 5 is detachably positioned on the piston 4. The mixing element 5 can thus be exchanged as required. In addition to the linear movement, it can be provided according to the invention that the piston 4 with the mixing element 5 is positioned such as to be rotatable around a longitudinal axis of the piston 4. With these two possibilities for moving the piston 4 and the mixing element 5, an effective and time-saving intermixing of the mass is ensured. At the same time, a stability of the piston 4 with the mixing element 5 is increased. The planar extension of the mixing element 5 is also critical for the complete intermixing of the mass. In this case, planar is to be understood as essentially two-dimensional, or the mixing element 5 is essentially wider than it is high or thick, wherein a width side is arranged roughly perpendicular to the piston 4. A geometric shape of the mixing element 5 can on the other hand be selected as desired, but this shape also depends on which mass is to be intermixed. However, it is advantageous if, in a top view, a geometry of the mixing element 5 corresponds to a cross section of the container transverse to the axis of movement of the piston. For example, in the case of a container with a round cross section, a mixing element that is round in a top view is advantageously provided. Other shapes disclosed by the invention for the mixing element 5 can be, for example, square, polygonal or undulating. It is thereby advantageous that the mixing element 5 is arranged at a distance from a wall of the container 2.

Further, at least one agitator 8 distanced from the piston can be provided in container 2. Agitator 8 can, for example, be a propeller known from the prior art, and can assist the mixing element 5 with masses that are costly to intermix. The agitator 8/propeller, which is typically arranged on the base of container 2, thereby lifts the mass off of the base and the mixing element 5 performs the remaining intermixing.

Figure 2:
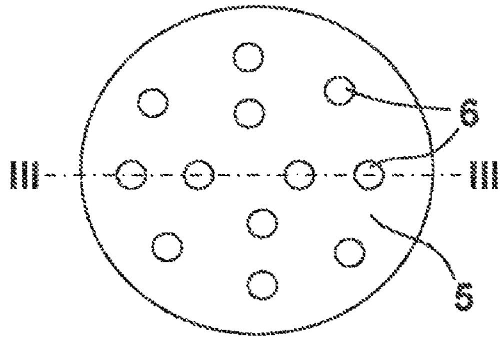
FIG. 2 illustrates a part of a variant of a device according to the invention in a top view.
Figure 3:
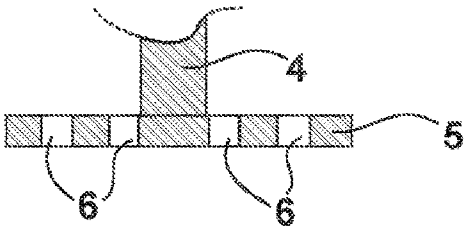
FIG. 3 illustrates a part of the variant of the device according to the invention from FIG. 2 in a cross section based on the line in FIG. 2.

FIG. 2 shows the mixing element 5 in a variant according to the invention. In this variant, the mixing element 5 is embodied roughly in a round manner and comprises multiple recesses 6. The recesses 6 can have any desired geometric shape and size. In FIG. 2, the recesses 6 are embodied as roughly round recesses 6. Furthermore, any desired number of recesses 6 can be provided, depending on which type of mass is to be intermixed or how high the viscosity of the mass is. One requirement therefor is that the mixing element 5 thereby constantly remains stable and is durable. It has been shown that the mixing element 5 should have a certain minimum thickness if heterogeneous masses are to be intermixed effectively. FIG. 3 shows the mixing element 5 from FIG. 2 in a cross section based on the line in FIG. 2.

Figure 4:
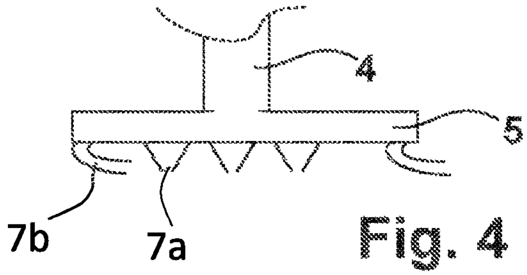
FIG. 4 illustrates a part of a further variant of a device according to the invention.

FIG. 4 shows a further variant of the device 1 according to the invention. Here, the mixing element 5 comprises cone-shaped extensions 7*a* and cylindrically curved extensions 7*b* on a side. In FIG. 4, the cylindrically curved extensions 7*b* are arranged at the outer sides. The curvature of the extensions 7*b* extends against the rotation direction of the piston 4 around the longitudinal axis thereof and provides an easier rotation of the mixing element 5. According to the invention, the extensions 7*b* can be arranged in any desired locations of the mixing element 5. Further to the center in FIG. 4, three cone-shaped extensions 7*a* are arranged on the mixing element 5. The cone-shaped extensions 7*a* facilitate the linear movement of the piston 4 with the mixing element 5 and taper in the direction away from the mixing element 5. The cone-shaped extensions 7*a* can also be embodied in a flexible or foldable manner. According to the invention, it can be provided that both types of the extensions 7*a*, 7*b* are arranged together, as illustrated in FIG. 4, or that only one type each of the extensions 7*a* or 7*b* is arranged on a mixing element 5. It can also be provided according to the invention, that the extensions 7*a*, 7*b* are welded onto the mixing element 5. However, other production possibilities are also conceivable, for example, a single-piece production by means of punching and bending from a metal sheet.

Figure 5:
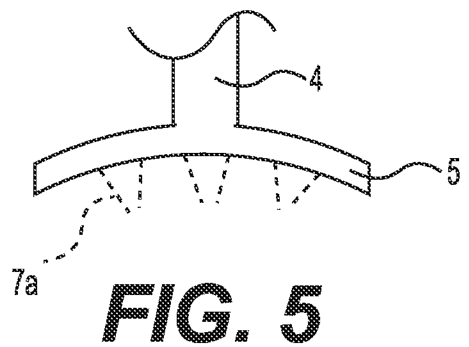
FIG. 5 illustrates a part of a further variant of a device according to the invention.
Figure 6:
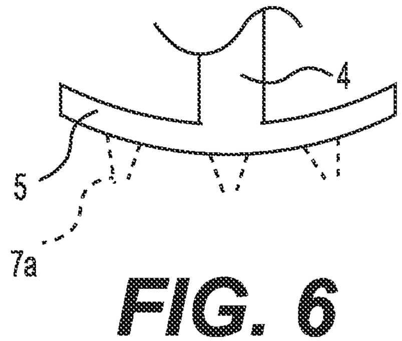
FIG. 6 illustrates a part of a further variant of a device according to the invention.

FIGS. 5 and 6 show two further variants of the device 1 according to the invention. In these cases, the mixing element 5 is not embodied in a flat manner, but rather in a curved manner. The curvature can thereby be embodied in both directions of the linear movement of the piston 4. If the mixing element 5 is arranged at a lower end of the piston 4, the curvature can be embodied away from the piston 4 or, as in FIG. 6, towards the piston 4. Any desired degree of the curvature can be selected. Furthermore, it can be provided that the mixing element 5 is formed from a pliable material and that the curvature of the mixing element 5 changes during the intermixing process, depending on the movement of the element. It can also be provided that the curvature of the mixing element 5 does not proceed evenly, but rather comprises additional bends.

Figure 7:
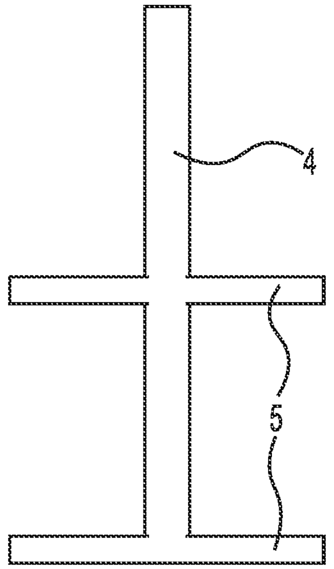
FIG. 7 illustrates a part of a further variant of a device according to the invention.

FIG. 7 shows a device 1 according to the invention with an additional mixing element 5. The additional mixing element 5 is arranged on the piston 4 at a vertical distance from the first mixing element 5 and has the same shape as the first mixing element 5.

The piston 4 is used with two or more mixing elements 5 arranged thereon for the intermixing of masses in tall containers 2. Any desired number of mixing elements 5 can be arranged on the piston, and these elements can respectively have different shapes. It is expedient to maintain a certain distance between the individual mixing elements 5 in order to prevent deposits thereon from parts of the mass. Furthermore, the mixing elements 5 should comprise recesses 6 in order to ensure a complete intermixing of the mass.

The container 2 can, for example, be a silo, a tank or a melting vessel. This container can thereby also be embodied with heat transfer surfaces in order to accelerate a heat exchange of the mass. Even though the indicated types of containers 2 all have a relatively large capacity, the device 1 according to the invention can already be used for containers 2 with a capacity of approximately five liters or more. The mixing unit 3, in particular the mixing element 5 and the piston 4, can be produced from a wide range of different materials, for example, from steel, stainless steel, metal, or from concrete, plastic, wood, ceramic or glass. The material selection used must be matched to requirements of the mass that is to be intermixed. If necessary, the mixing element 5 can be embodied in a fireproof manner, for example, for applications in the metal producing industry. Materials for producing the container 2 are known from the prior art. Optionally, a seal can be provided between the container 2 and the mixing unit 3, depending on where the mixing unit 3 is arranged on the container 2. The seal can, for example, be a static, translational or dynamic seal. The device can be controlled manually, electrically or mechanically, for example by a spring, and is individually adaptable.

Figure 8:
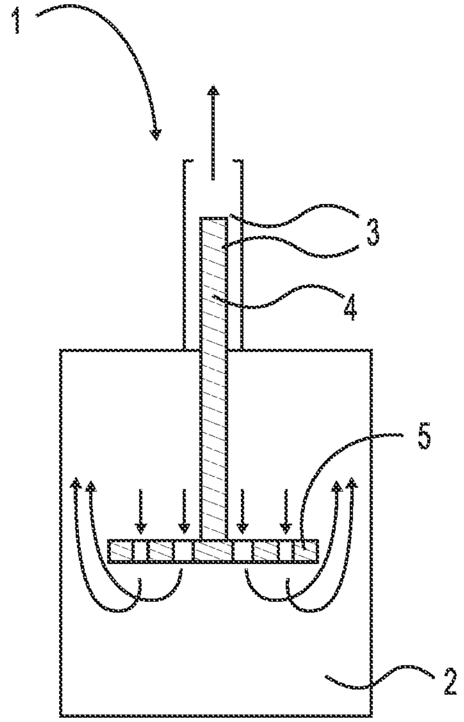
FIG. 8 illustrates a method according to the invention.

At the present time, the exact manner in which the mass is intermixed in the container 2 has not yet been conclusively resolved. FIG. 8 illustrates the currently presumed mechanism of action of a method according to the invention for intermixing a mass, in particular a free-flowing mass such as finely grained powder or a dispersion. In FIG. 8, the piston 4 is moved upwards, that is, out of the device 1, and simultaneously rotated about a longitudinal axis. The effect of the intermixing of a mass mainly occurs when the piston 4 with the mixing element 5 is pulled out. The mass is intermixed in a particularly effective manner if the mixing element 5 comprises multiple recesses 6, as shown in FIG. 8. During the movement upward of the piston 4 with the mixing element 5, the mass is pushed downwards through the recesses 6 in the mixing element 5. In order to equalize the resulting pressure differences, mass flows upwards between the mixing element 5 and the walls of the container 2. Turbulences or varying flows occur, and the mass is intermixed. The process of intermixing and the movement directions of the mass is illustrated in FIG. 8 by arrows. It is advantageous if the mixing element 5 is constantly fully covered by the mass, in order to keep an introduction of air as low as possible. It can also be provided that a propeller is arranged on the base of the container 2 for the purpose of assisting the mixing element 5. Through the linear movement of the piston 4 and the possibly additional rotation of the same and of the mixing element 5 arranged on the piston 4, a mass can be intermixed in a relatively easy, time-saving and energy-saving manner. A mass can be brought to temperature, pH homogenized or stably stored. It is further advantageous that shearing forces during the intermixing process are kept to a minimum by a device 1 according to the invention. As a result, the device 1 can also be used in combination with storage containers.

The device 1 for intermixing masses can be used universally; masses with viscosities in the range from 1 mPa up to 500 Pa can be intermixed. Thus, for example, dispersions, suspensions, mashes, sludge, waste water, fluidized substance mixtures and melts can be intermixed and/or heated and/or cooled and/or pH homogenized using the device 1. An embodiment of the mixing device 5 must thereby be adapted to the viscosity and the temperature of the mass that is to be intermixed. A device 1 according to the invention is also used in fermentation tanks. Particularly in large-volume fermentation tanks, a demixing of the mass often occurs due to temperature differences. This undesired process can be counteracted by the device 1. This results in an applicability in a wide range of different areas, for example in the food industry, in chemistry, in materials engineering, in cosmetics, in pharmaceutical production, in biotechnology, in brewing, in distilling, in casting or in tank logistics. Especially for an application in casting, the mixing element 5 should be embodied in a fireproof manner. The mixing unit 3 can be used with any type of a container 2, if necessary, the unit can also be arranged on a container 2 at a later point in time. Furthermore, the mixing unit can also be used in a supporting role, for example, in combination with a propeller known from the prior art. It can be provided that the mixing unit 5 is detachably arranged on the piston 4 so that it can be exchanged for different masses. For this purpose, a connector can be provided at an upper end of the mixing element 5, into which connector the piston 4 can be inserted and attached. Alternatively, the connector can also be arranged on the piston 4, in order to be connected to the mixing element 5.

The invention claimed is:

1. A device for intermixing a mass, comprising:

a container having a base; and a mixing unit arranged on the container, wherein the mixing unit comprises at least one piston that is positioned in the container, and is movable in a linear direction and has at least one mixing element with parallelly arranged upper and lower surfaces, wherein the at least one mixing element extends around the piston and includes cone-shaped extensions extending from the lower surface and conically tapering in the linear direction away from the lower surface to an opening at an end of the cone-shaped extensions facing a bottom of the container to facilitate movement of the piston in the linear direction for intermixing the mass, and wherein the at least one mixing element has a diameter of at least 10% and up to 40% of a diameter of the base of the container.

2. The device according to claim 1, wherein the at least one mixing element is positioned at a first end of the piston.

3. The device according to claim 1, wherein the piston is positioned such that it can be rotated around a longitudinal axis.

4. The device according to claim 1, wherein, in a geometric center of the at least one mixing element, the piston is connected to the at least one mixing element, wherein the at least one mixing element extends on a plane around the piston.

5. The device according to claim 1, wherein the at least one mixing element comprises recesses.

6. The device according to claim 1, wherein the piston is positioned in a vertically moveable manner.

7. The device according to claim 6, wherein the at least one mixing unit is fixed at an upper end of the container.

8. The device according to claim 1, wherein at least one agitator distanced from the piston is provided.

9. The device according to claim 1, wherein at least one additional mixing element is provided, wherein the at least one additional mixing element is fixed on the piston at a distance from the first mixing element.

10. A method for producing mash comprising:

intermixing a mass in a container with the device according to claim 1, wherein the mass comprises a mash.

11. The device according to claim 1, wherein the mass comprises at least one of a dispersion, suspension, mash, sludge, waste water, fluidized substance mixtures and melts.

12. The device according to claim 1, wherein the cone-shaped extensions are embodied in a flexible or foldable manner.

13. The device according to claim 1, wherein the upper and lower surfaces of the at least one mixing element are embodied as one of parallel planar surfaces or parallel curved surfaces.

14. The device according to claim 1, wherein the diameter of the at least one mixing element is between 25% and 40% of the diameter of the base of the container.

15. A device for intermixing a mass, comprising:

a container; and a mixing unit arranged on the container, wherein the mixing unit comprises at least one piston that is positioned in the container, and is movable in a linear direction and has at least one mixing element, wherein the at least one mixing element extends around the piston and includes an upper planar surface and an opposed lower planar surface, the at least one mixing element further includes cone-shaped extensions extending from the lower planar surface and conically tapering in the linear direction away from the lower planar surface to an opening at an end of the cone-shaped extensions facing a bottom of the container to facilitate movement of the piston in the linear direction for intermixing the mass, and wherein the at least one mixing element further comprises cylindrically curved extensions extending from the lower planar surface.

16. The device according to claim 15, wherein a ratio a diameter of the container to the mixing element is at least 1.2:1.

17. A method for intermixing a mass in a container with a mixing unit arranged on the container comprising:

moving the mixing unit, which is arranged on the container, within the mass, wherein the mixing unit comprises at least one piston movable in a linear direction and at least one mixing element positioned around the piston, wherein the at least one mixing element includes an upper surface with a parallel lower surface, the at least one mixing element further includes cone-shaped extensions extending from the lower surface and conically tapering in the linear direction away from the lower surface to an opening at an end of the cone-shaped extensions facing a bottom of the container to facilitate movement of the piston in the linear direction for intermixing the mass, and wherein the at least one mixing element has a diameter of at least 10% and up to 40% of a diameter of a base of the container.

18. The method according to claim 17, wherein the at least one mixing element comprises recesses and the mass is circulated while flowing through the recesses.

19. The method according to claim 17, wherein the piston and the at least one mixing element are rotated around a longitudinal axis of the piston.

20. The method according to claim 17, wherein the cone-shaped extensions are embodied in a flexible or foldable manner.

21. The method according to claim 17, wherein the mass comprises at least one of a dispersion, suspension, mash, sludge, waste water, fluidized substance mixtures and melts.

22. The method according to claim 17, wherein the upper and lower surfaces of the at least one mixing element are embodied as one of parallel planar surfaces or parallel curved surfaces.

23. The method according to claim 17, wherein a speed of movement of the piston is adaptable to the mass and between 0.01 m/s and 10 m/s.

24. The method according to claim 17, wherein the at least one mixing element further comprises cylindrically curved extensions extending from the lower surface.

25. The method according to claim 17, wherein the diameter of the at least one mixing element is between 25% and 40% of the diameter of the base of the container.

26. A device for intermixing a mass, comprising:

a container having a base, and a mixing unit arranged on the container, wherein the mixing unit comprises at least one piston that is positioned in the container, and is movable in a linear direction and has at least one mixing element, wherein the at least one mixing element extends around the piston and includes an upper surface with a parallel lower surface, the at least one mixing element further includes cone-shaped extensions extending from the lower surface and conically tapering in the linear direction away from the lower surface to an opening at an end of the cone-shaped extensions facing a bottom of the container to facilitate movement of the piston in the linear direction for intermixing the mass, wherein the at least one mixing element has a diameter of at least 10% and up to 40% of a diameter of the base of the container, wherein the upper and lower surfaces of at least one mixing element are embodied as parallel curved surfaces, and wherein a speed of movement of the piston is adaptable to the mass and between 0.01 m/s and 10 m/s.

27. The device according to claim 26, wherein the diameter of the at least one mixing element is between 25% and 40% of the diameter of the base of the container.

28. A device for intermixing a mass, comprising:

a container having a base; and a mixing unit arranged on the container, wherein the mixing unit comprises at least one piston that is positioned in the container. and is movable in a linear direction and has at least one mixing element, wherein the at least one mixing element extends around the piston and includes parallelly arranged upper and lower surfaces and recesses through which the mass passes through the mixing element, wherein the at least one mixing element has a diameter of at least 10% and up to 40% of a diameter of the base of the container, wherein the at least one mixing element is structured with conical surfaces decreasing in diameter toward the base of the container to conically reduce a flow path of the mass passing through the mixing element in a direction toward a bottom of the container.

29. The device according to claim 28, wherein the conical surfaces extend from the lower surface of the at least one mixing element.

* * * * *